(12) United States Patent
Yoon

(10) Patent No.: US 12,325,424 B2
(45) Date of Patent: Jun. 10, 2025

(54) TRACTION CONTROL METHOD FOR VEHICLE

(71) Applicants: Hyundai Motor Company, Seoul (KR); Kia Corporation, Seoul (KR)

(72) Inventor: Ye Ahn Yoon, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 329 days.

(21) Appl. No.: 18/105,715

(22) Filed: Feb. 3, 2023

(65) Prior Publication Data

US 2024/0123995 A1 Apr. 18, 2024

(30) Foreign Application Priority Data

Oct. 14, 2022 (KR) .................. 10-2022-0132112

(51) Int. Cl.
*B60W 30/18* (2012.01)
*B60W 10/04* (2006.01)
*B60W 10/18* (2012.01)
*B60W 50/10* (2012.01)

(52) U.S. Cl.
CPC ...... *B60W 30/18172* (2013.01); *B60W 10/04* (2013.01); *B60W 10/18* (2013.01); *B60W 50/10* (2013.01); *B60W 2510/18* (2013.01); *B60W 2520/26* (2013.01); *B60W 2520/28* (2013.01); *B60W 2552/40* (2020.02); *B60W 2710/083* (2013.01); *B60W 2710/18* (2013.01); *B60W 2720/26* (2013.01); *B60W 2720/28* (2013.01)

(58) Field of Classification Search
None
See application file for complete search history.

(56) References Cited

U.S. PATENT DOCUMENTS 5,263,548 A * 11/1993 Tsuyama ................. B60T 8/175
701/84
2002/0107106 A1 8/2002 Kato et al.
(Continued)

FOREIGN PATENT DOCUMENTS

JP 1995-257349 A 10/1995
JP 2017-114313 A 6/2017
(Continued)

*Primary Examiner* — Peter D Nolan
*Assistant Examiner* — Jacob Kent Besteman-Street
(74) *Attorney, Agent, or Firm* — Morgan, Lewis & Bockius LLP

(57) ABSTRACT

A traction control method for a vehicle provided with a torque vectoring apparatus including a torque vectoring motor includes determining, by first and second controllers, whether a current situation is a split-µ situation occurring when the vehicle is driven on a split road surface, based on vehicle driving information collected in the vehicle, determining and creating, by the second controller, a target speed for control of a slip wheel speed when both controllers determine the split-µ situation, and transmitting the target speed from the second controller to the first controller, generating, by the first controller, a torque command for the torque vectoring motor for slip wheel speed control to follow the target speed received from the second controller, and controlling, by the first controller, operation of the torque vectoring motor in accordance with the torque command.

19 Claims, 5 Drawing Sheets

(56) References Cited

U.S. PATENT DOCUMENTS

| | | | |
|---|---|---|---|
| 2012/0078483 A1* | 3/2012 | Yajima | B60T 8/1764 701/73 |
| 2014/0025241 A1* | 1/2014 | Andou | B60K 28/16 701/22 |
| 2014/0162842 A1* | 6/2014 | Severinsson | F16H 48/36 477/35 |
| 2015/0175009 A1 | 6/2015 | Beever et al. | |
| 2019/0023275 A1* | 1/2019 | Coerman | B60W 30/02 |
| 2019/0338842 A1* | 11/2019 | Velazquez Alcantar | B60W 30/18172 |
| 2023/0039043 A1* | 2/2023 | Jeon | B60W 10/184 |
| 2023/0242121 A1* | 8/2023 | Salif | B60T 8/1764 701/70 |

FOREIGN PATENT DOCUMENTS

| | | |
|---|---|---|
| JP | 2019-031112 A | 2/2019 |
| JP | 2021-191194 A | 12/2021 |
| KR | 10-1343226 B | 12/2013 |

* cited by examiner

TRACTION CONTROL METHOD FOR VEHICLE

CROSS-REFERENCE TO RELATED APPLICATION

The present application claims priority to Korean Patent Application No. 10-2022-0132112 filed on Oct. 14, 2022, the entire contents of which is incorporated herein for all purposes by this reference.

BACKGROUND OF THE PRESENT DISCLOSURE

Field of the Present Disclosure

The present disclosure relates to a traction control method for a vehicle, and to a traction control method for a vehicle provided with a torque vectoring apparatus, which is configured for enhancing launching response and linearity of the vehicle through appropriate distribution of left and right driving forces in a split-μ situation of the vehicle.

Description of Related Art

Generally, electronic stability control (ESC) for stably controlling a posture of a vehicle is known as an electronic control system for enhancing stability while driving of the vehicle.

The ESC is a system for securing stability of a vehicle while driving or braking of the vehicle by operating an anti-lock brake system (ABS) to prevent brake locking caused by wheel slip on a slippery road surface, and a traction control system (TCS) to prevent wheel slip through control of driving force or braking force upon sudden acceleration or launching, or the like.

The TCS is an active safety device for preventing wheelspin of a vehicle and enhancing launching performance and acceleration performance, and steering stability by preventing excessive slip of drive wheels during launching or acceleration of the vehicle on a low-friction road surface or an asymmetrical road surface.

When a phenomenon such as wheel slip or the like occurs at a vehicle due to generation of excessive driving force upon starting or acceleration of the vehicle on a slippery road surface, the TCS controls speed of drive wheels so that acceleration of the vehicle is maximized by controlling driving force (driving torque) or braking force (braking torque) of the vehicle.

Here, the driving force of the vehicle may mean a torque output from a driving device, and the driving device may be a motor (a pure electric vehicle or a fuel cell vehicle), an engine (an internal combustion engine vehicle), or a motor and an engine (a hybrid vehicle).

For example, in the case of a motor-driven vehicle such as a pure electric vehicle, a fuel cell vehicle, or a hybrid vehicle, the TCS determines a target speed, at which optimal driving force is obtained by drive wheels in accordance with an amount of slip generated between the drive wheels and a road surface, a coefficient of friction of the road surface, etc., and controls a motor torque to follow the target speed.

Furthermore, when the vehicle turns on a corner road, the TCS reduces the motor torque, for prevention of instability of the vehicle, facilitating the vehicle to safely turn.

Furthermore, various chassis control technologies have recently been employed in vehicles to improve handling performance. A representative handling performance improving method is a torque vectoring control technology.

A device for performing torque vectoring, that is, a torque vectoring device, independently and freely adjusts the magnitude of torque transmitted to left and right wheels to enhance agility and handling performance of a vehicle. Here, "torque" is meant to include both driving torque and braking torque.

The term "torque vectoring" refers to the magnitude and direction of an output or driving force of a driving device (a motor, an engine, or a motor and an engine) transmitted to wheels of a vehicle, and implies technology for changing the magnitude and direction of the torque transmitted to the wheels, and in particular, the torque transmitted to both wheels, that is, the left and right wheels, on the same axle.

Furthermore, in association with an electrified vehicle provided with an electrified powertrain apparatus including a motor, that is, a motor-driven vehicle (including a hybrid vehicle) configured to be driven using a motor, technology for realizing torque vectoring using a driving device and a brake in the vehicle is known. The brake means a wheel brake which is a frictional braking device (typically, a hydraulic braking device) configured to apply braking force to a wheel.

Meanwhile, a road surface having different coefficients of friction at a left road surface thereof contacting with a left wheel of a vehicle and at a right road surface thereof contacting with a right wheel of the vehicle is referred to as a "split road surface", and a driving situation on such a split road surface is referred to as a "split-μ situation". That is, when a road surface state of a road on which a vehicle is currently driven is a split road surface, the present situation is a split-μ situation.

When a torque is applied to drive wheels of a vehicle, for launching of the vehicle on a split road surface, the torque is transmitted to the wheel on a road surface having a lower coefficient of friction by a differential mechanism of the vehicle, and accordingly, a phenomenon that the wheels excessively slip occurs.

To stably control a vehicle on a split road surface, conventional TCSs and ESCs perform speed control in a split-μ situation by reducing a driving torque and applying a braking torque to a wheel (a slipping wheel), at which slip is generated.

However, there are problems in that, in a procedure of performing braking torque control to stably control a vehicle, it may be impossible to effectively suppress initial wheel slip due to slow response of a hydraulic braking device, and accordingly, vehicle control may be unstable, and the driver may feel a sense of difference in driving.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a traction control method for a vehicle provided with a torque vectoring apparatus, which is configured for enhancing launching response and linearity of the vehicle through appropriate distribution of left and right driving forces when the vehicle is disposed on a split road surface.

Objects of the present disclosure are not limited to the above-described objects, and other objects of the present disclosure not yet described will be more clearly understood by those skilled in the art from the following detailed description. Furthermore, objects of the present disclosure may be accomplished by means defined in the appended claims and combinations thereof.

Various aspects of the present disclosure are directed to providing a traction control method for a vehicle provided with a torque vectoring apparatus including a torque vectoring motor, the traction control method including determining, by a first controller and a second controller, whether or not a current situation of the vehicle is a split-μ situation occurring when the vehicle is driven on a split road surface, based on vehicle driving information collected in the vehicle, determining and creating, by the second controller, a target speed for control of a slip wheel speed when the first controller and the second controller are configured to determine that the current situation is the split-μ situation, and transmitting the target speed from the second controller to the first controller, generating, by the first controller, a torque command for the torque vectoring motor for control of the slip wheel speed to follow the target speed received from the second controller, and controlling, by the first controller, operation of the torque vectoring motor in accordance with the generated torque command.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Other aspects and exemplary embodiments of the present disclosure are discussed infra.

The above and other features of the present disclosure are discussed infra.

Figure 1:
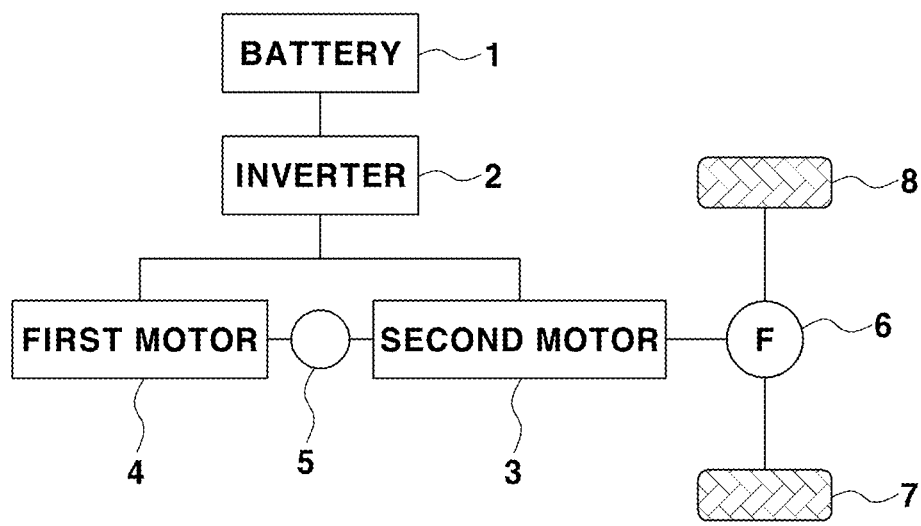
FIG. 1, FIG. 2, and FIG. 3 are views exemplarily illustrating a hardware configuration of a motor-driven torque vectoring apparatus usable in an exemplary embodiment of the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element.

In the case where an element is "connected" or "linked" to another element, it may be understood that the element may be directly connected or linked to the other element, or another element may be present therebetween. On the other hand, in the case where an element is "directly connected" or "directly linked" to another element, it may be understood that no other element is present therebetween. Other expressions describing a relation between constituent elements, such as "between~" and "immediately between~", or "adjacent to~" and "directly adjacent to~", and the like, may be construed in a similar manner.

Throughout the specification, the same reference numerals will refer to the same elements. It should be noted that terms used herein are merely used to describe a specific embodiment, not to limit the present disclosure. Incidentally, unless clearly used otherwise, singular expressions include a plural meaning. In this application, the term "comprises" and/or "comprising" is intended to express the existence of the mentioned constituent element, step, operation, and/or device, and does not exclude the existence or addition of another constituent element, step, operation, and/or device.

Various embodiments of the present disclosure relates to a traction control method for a vehicle provided with a torque vectoring apparatus. Here, the torque vectoring apparatus may be a motor-driven torque vectoring apparatus, and the motor-driven vectoring device may include a torque vectoring motor.

In an exemplary embodiment of the present disclosure, traction control using a motor-driven torque vectoring apparatus may be performed, and the motor-driven torque vectoring apparatus used for traction control may be a known torque vectoring apparatus, a hardware configuration of which is known.

Figure 2:
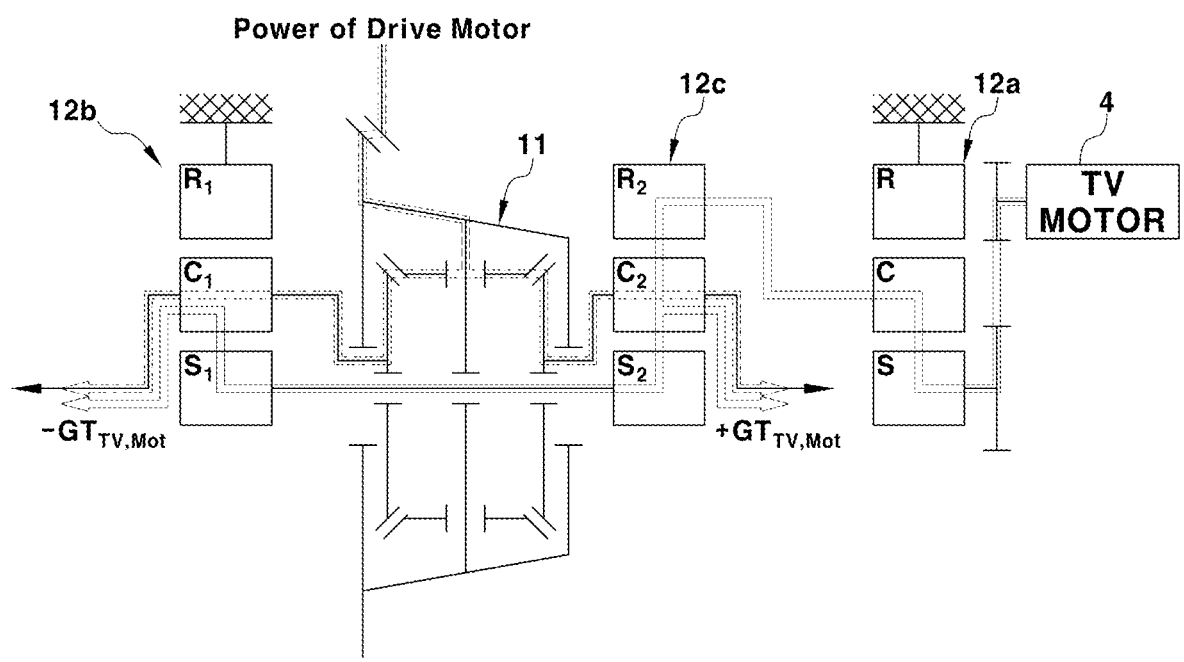
Figure 3:
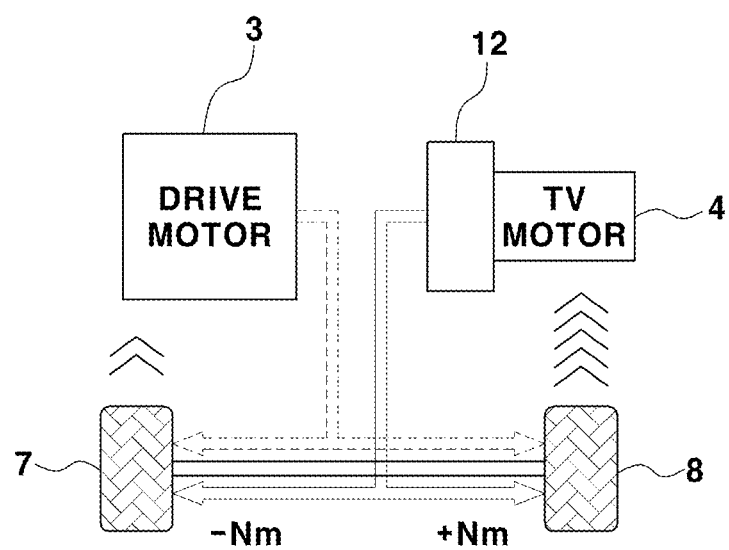

FIG. 1, FIG. 2, and FIG. 3 illustrate a hardware configuration of a motor-driven torque vectoring apparatus usable in an exemplary embodiment of the present disclosure. In an example of FIG. 1, a first motor 3 is a drive motor configured to drive a vehicle, a second motor 4 is a motor usable as a torque vectoring (TV) motor. Hereinafter, the torque vectoring motor will be referred to as a "TV motor".

Referring to FIG. 1, a battery 1 is connected to the first motor 3, which is a drive motor, and the second motor 4, which is a TV motor so that the battery 1 is rechargeable and dischargeable. Both the first motor 3 and the second motor 4 operate by electric power supplied from the battery 1 via an inverter 2.

Furthermore, the first motor 3 and the second motor 4 are connected to drive wheels of the vehicle, that is, a left wheel 7 and a right wheel 8 shown in FIG. 1 so that the first motor 3 and the second motor 4 may transmit power to the left wheel 7 and the right wheel 8. The vehicle may be driven and run by torques applied from the first motor 3 and the second motor 4 to the left wheel 7 and the right wheel 8.

Furthermore, a torque vectoring mechanism 5, in which a star gear set or the like is combined, is connected to an output side of the second motor 4 which is a TV motor. As a result, the torque from the second motor 4 is applied to the left wheel 7 and the right wheel 8 in a distributed manner through the torque vectoring mechanism 5, and accordingly, torque vectoring may be performed.

The inverter 2 is configured to drive and control the first motor 3 and the second motor 4. When a vehicle control unit (VCU) ("20" in FIG. 4) generates and outputs a motor torque command based on vehicle driving information collected in real time, a motor control unit (MCU) ("40" in FIG. 4) drives the inverter 2 in accordance with the motor torque command output from the vehicle control unit.

Furthermore, when electric power from the battery 1 is applied to the motors 3 and 4 via the inverter 2, DC current of the battery 1 is converted into three-phase AC current by the inverter 2 driven in accordance with the motor torque command, and the three-phase AC current is applied to the motors 3 and 4 which, in turn, output torques.

The torques output from the motors 3 and 4 are applied to the left wheel 7 and the right wheel 8 via a reducer, transmission, or differential (a differential mechanism) 6. In FIG. 1, the reducer or transmission is omitted.

When the vehicle is a hybrid vehicle, an engine clutch may be mounted between an engine not shown and the drive motor, and a transmission may be mounted to an output side of the drive motor.

In the hybrid vehicle in which the transmission is mounted at the output side of the drive motor, that is, a transmission mounted electric device (TMED) type hybrid vehicle, a starter-generator directly connected to the engine so that the starter-generator may transmit power to the engine, that is, a hybrid starter-generator (HSG), may be used as the second motor which is a TV motor.

Furthermore, as illustrated in FIG. 2, the torque vectoring apparatus may have a configuration in which a differential 11, to which power from the drive motor (the first motor) is transmitted, the TV motor (the second motor) 4, and a plurality of star gear sets 12a, 12b, and 12c mounted between the TV motor 4 and the drive wheels are combined.

As in an example of a driving system shown in FIG. 2, the plurality of star gear sets may include a first star gear set 12a mounted at the output side of the TV motor 4, a second star gear set 12b mounted between the differential 11 and the left wheel, and a third star gear set 12c mounted between the differential 11 and the first star gear set 12a and the right wheel.

FIG. 3 is a view explaining a state of a torque transmitted to the left wheel 7 and the right wheel 8 by the drive motor 3 and the TV motor 4. Referring to FIG. 3, it may be seen that a torque vectoring mechanism 12, which is a power transmission mechanism including a star gear set, is mounted at the output side of the TV motor 4.

When rear wheels are drive wheels in an example in which a differential, a TV motor, and a plurality of star gear sets are combined in a torque vectoring apparatus, a torque transmitted to a left wheel 7 of the rear wheels and a torque transmitted to a right wheel 8 of the rear wheels are expressed by the following Equations 1 and 2:

$$T_{RL} = \frac{1}{2} \times A \times T_{main, Mot} + G \times T_{TV, Mot} \quad \text{[Equation 1]}$$

$$T_{RR} = \frac{1}{2} \times A \times T_{main, Mot} - G \times T_{TV, Mot} \quad \text{[Equation 2]}$$

where, $T_{RL}$ represents a torque applied to the left wheel 7 of the rear wheels (a rear left wheel torque), $T_{RR}$ represents a torque applied to the right wheel 8 of the rear wheels (a rear right wheel torque), and $T_{TV, Mot}$ represents a torque output from the TV motor 4 (a TV motor torque). Furthermore, A represents a rear motor gear ratio, and G represents a TV motor gear ratio.

In the instant case, the speed of the TV motor 4 is expressed by the following Equation 3:

$$N_{TV} G \times (N_{RL} - N_{RR}) \quad \text{[Equation 3]}$$

where, $N_TV$ represents a TV motor speed, $N_{RL}$ represents a rear left wheel speed, and $N_{RR}$ represents a rear right wheel speed.

Figure 4:
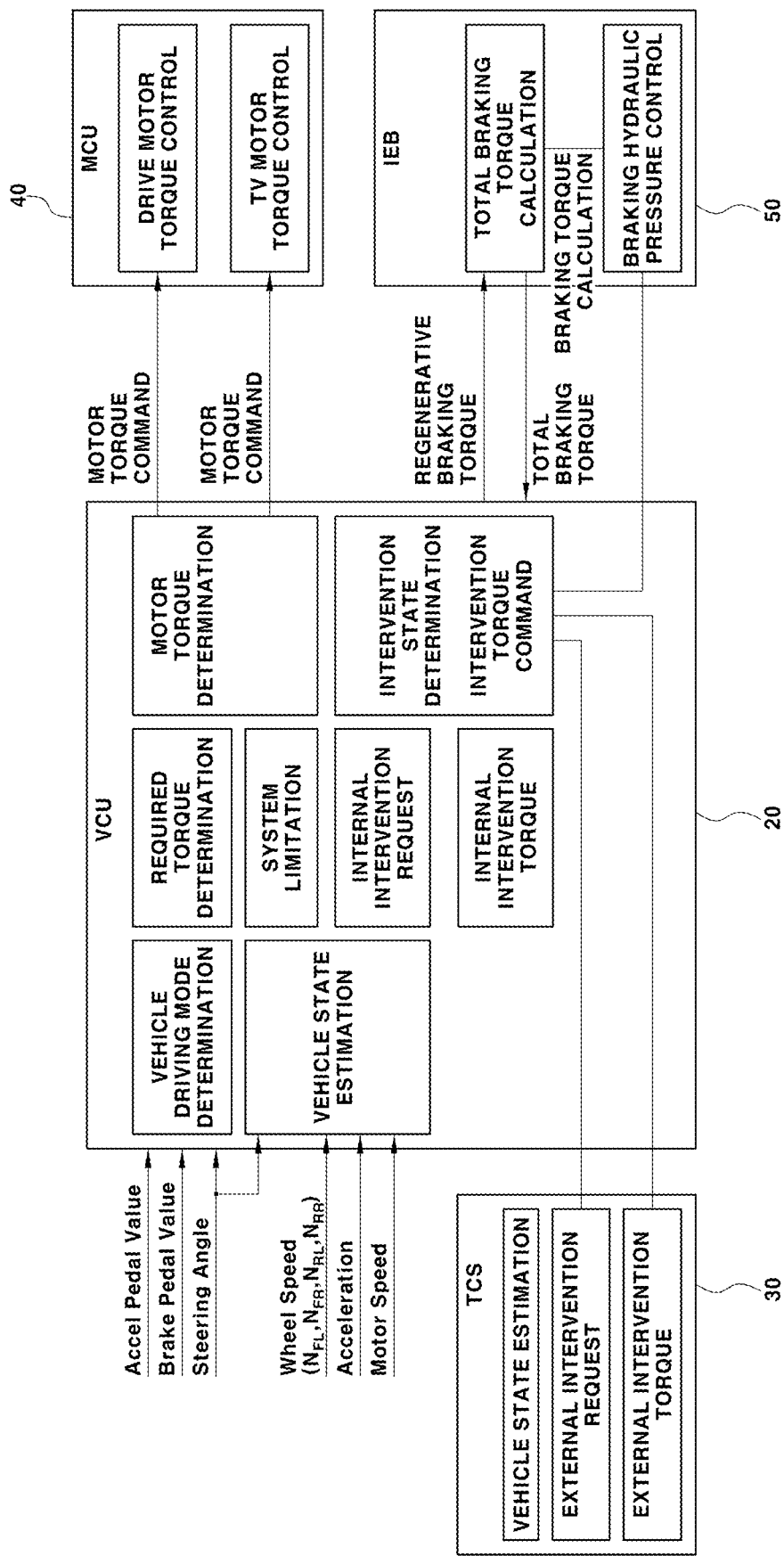
FIG. 4 is a block diagram showing a control device configured to perform a traction control procedure according to various exemplary embodiments of the present disclosure.

FIG. 4 is a block diagram showing a control device configured to perform a traction control procedure according to various exemplary embodiments of the present disclosure. Traction control for a vehicle provided with a TV motor in accordance with various exemplary embodiments of the present disclosure may be performed through cooperative control by a plurality of controllers in the vehicle.

Referring to FIG. 4, cooperative control performed by a vehicle control unit 20 (hereinafter referred to as a "VCU"), a TCS controller 30 (hereinafter referred to as a "TCS"), a motor control unit 40 (hereinafter, referred to as an "MCU"), and a brake controller 50 (hereinafter referred to an "IEB") is shown.

In FIG. 4, "IEB" represents the brake controller, and the brake controller, which performs cooperative control, may be a controller of an integrated electric brake (IEB). The controller of the IEB is included in a configuration of the integrated electric brake (IEB). In FIG. 4, the controller of the IEB performing cooperative control is represented by "IEB".

Furthermore, "TCS" in FIG. 4 represents a TCS controller. The TCS controller may be substituted with an ESC controller. The TCS controller is included in a configuration of a traction control system (TCS), and may be represented by a "traction controller" or may be simply represented by "TCS". Similarly, the ESC controller is included in a configuration of an electronic stability control system (ESC), and may be simply represented by "ESC".

In claims of the present disclosure, the first controller is the VCU 20, and the second controller is the TCS controller 30.

The VCU 20 obtains, in real time, vehicle driving information detected through a driving information detection unit of the vehicle, estimates a vehicle state based on the obtained real-time vehicle driving information, determines a vehicle driving mode, and determines a required total torque. In the instant case, the vehicle driving information includes an accelerator pedal input value (an APS value), a brake pedal input value (a BPS value), a steering angle (an SAS value), a wheel speed, a motor speed, and a vehicle acceleration.

Furthermore, the driving information detection unit includes an accelerator pedal sensor configured to detect an accelerator pedal input value of the driver ("Accel Pedal Value" in FIG. 4), a brake pedal sensor configured to detect a brake pedal input value of the driver ("Brake Pedal Value" in FIG. 4), a steering angle sensor configured to detect a steering angle ("Steering Angle" in FIG. 4) as a steering input value of the driver, a wheel speed sensor configured to detect a wheel speed of the vehicle ("Wheel Speed" in FIG. 4), an acceleration sensor configured to detect an acceleration of the vehicle ("Acceleration" in FIG. 4), and a sensor configured to detect a motor speed ("Motor Speed" in FIG. 4).

The accelerator pedal sensor and the brake pedal sensor may be a typical accelerator pedal sensor (APS) and a typical brake pedal sensor (BPS) mounted to an accelerator pedal and a brake pedal, respectively. The sensor configured to detect a motor speed may be a typical resolver mounted to each of a drive motor and a TV motor.

The VCU 20 determines a required total torque according to a driving intention of the driver based on the real-time vehicle driving information. Furthermore, to perform a control function according to a predetermined control logic, the VCU 20 checks whether or not a request for self-controlled intervention is needed, and requests internal intervention for torque correction upon determining that the self-controlled intervention is needed, and at the same time, determines an internal intervention torque.

Furthermore, the VCU 20 receives an external intervention request and external intervention torque information from an external controller, determining an external intervention situation caused by the external controller. In the instant case, the VCU 20 receives an external intervention request and external intervention torque information for controlled intervention and torque correction from the external controller, to perform a control function according to a predetermined control logic, such as stability control, turning radius reduction control, or the like.

Accordingly, the VCU 20 performs determination of an intervention state in accordance with an internal intervention request and an external intervention request, and determines a final intervention torque command based on internal intervention torque information and external intervention torque information.

Furthermore, upon determining a required total torque command, the VCU 20 determines a motor torque command based on the required total torque command, taking into consideration battery and electric load situations, etc. while applying a system limitation value.

Furthermore, the VCU 20 determines a motor torque command for a drive motor (a first motor) ("3" in FIG. 1) and a motor torque command for a TV motor (a second motor) ("4" in FIG. 1) based on the determined motor torque command and the determined intervention torque command, and sends the determined motor torque command to the MCU 40.

Accordingly, the MCU 40 is configured to control operations of the drive motor 3 and the TV motor 4 through an inverter ("2" in FIG. 1), using motor efficiencies and mapped values determined in accordance with the motor torque command sent from the VCU 20. In the instant case, the MCU 40 may perform anti-jerk control for motor vibration offset and reduction, using motor speed information, etc.

The brake controller (IEB) 50 determines a required total braking torque based on a brake pedal input value of the driver. Furthermore, the brake controller 50 determines a frictional braking torque based on regenerative braking torque information (regenerative braking execution amount information) received from the VCU 20, and then is configured to control a braking hydraulic pressure of the wheel brake, which is a frictional braking device (a hydraulic braking device) for a wheel, in accordance with the determined frictional braking torque. As a result, a required frictional braking force may be applied to the wheel by the frictional braking device.

The TCS controller 30 (or the ECS controller) estimates vehicle states such as vehicle speed, oversteer, understeer, cornering stiffness, etc., based on real-time vehicle driving information collected from the vehicle, performs cooperative control with other controllers such as the VCU 20, the MCU 40, the brake controller (IEB) 50, etc., for stability control, to enable control of a braking hydraulic pressure of each wheel brake (the frictional braking device of each wheel), and requests control intervention.

Here, as vehicle driving information, a single piece or a plurality of pieces of additional vehicle state information transmitted from other sensors or other controllers may be used in addition to information detected by the above-described driving information detection unit.

Furthermore, the TCS controller 30 performs cooperative control with other controllers, for torque vectoring control, to enable control of a braking hydraulic pressure of each wheel brake, determines an intervention torque, and requests control intervention (determination of an external intervention torque and request for external intervention).

Meanwhile, in accordance with the exemplary embodiment of the present disclosure, the VCU 20 and the TCS controller 30 may determine whether or not a current driving situation of the vehicle is a situation that the vehicle is driven on a split road surface including different coefficients of friction at a left road surface thereof contacting with a left wheel of the vehicle and at a right road surface thereof contacting with a right wheel of the vehicle, that is, a split-μ situation, based on vehicle driving information collected from the vehicle.

Furthermore, when the current driving situation is the split-μ situation, the VCU 20 and the TCS controller 30 may individually perform speed control for the wheel, at which slip occurs, that is, the slipping wheel. In in accordance with the exemplary embodiment of the present disclosure, the VCU 20 and the TCS controller 30 may perform various cooperative control in a split-μ situation. When the two controllers determine a split-μ situation, the two controllers may perform cooperative control. In cooperative control, the VCU 20 may perform speed control for the slipping wheel based on a target speed received from the TCS controller 30.

Furthermore, when the VCU 20 performs speed control for the slipping wheel based on the target speed received from the TCS controller 30, the TCS controller 30 may perform control for braking torque reduction of the frictional braking device and control for driving torque reduction of the drive motor 3, based on a torque value of the TV motor 4. During execution of the cooperative control, the TCS controller 30 may have a right to control the drive motor 3, whereas the VCU 20 may have a right to control the TV motor 4.

In a procedure in which the TCS controller 30 requests control intervention and determines an intervention torque, when a split-μ situation has occurred, the TCS controller 30 requests the VCU 20 to perform control intervention in accordance with an internal logic thereof, and requests the VCU 20 to perform torque intervention for the drive motor 3 in accordance with an internal logic thereof. Furthermore, the TCS controller 30 requests the brake controller 50 to perform torque intervention for the frictional braking device in accordance with an internal logic thereof.

In an exemplary embodiment of the present disclosure, "control intervention" and "torque intervention" may mean torque correction for execution of control functions, and in the instant case, an intervention torque may mean a correction torque.

Heretofore, execution of intervention request and intervention torque determination by the VCU 20 and execution of speed control for a slipping wheel based on a target speed of the TCS controller 30 in a split-μ situation have been described. Hereinafter, a procedure for the above-described speed control will be described in more detail.

Figure 5:
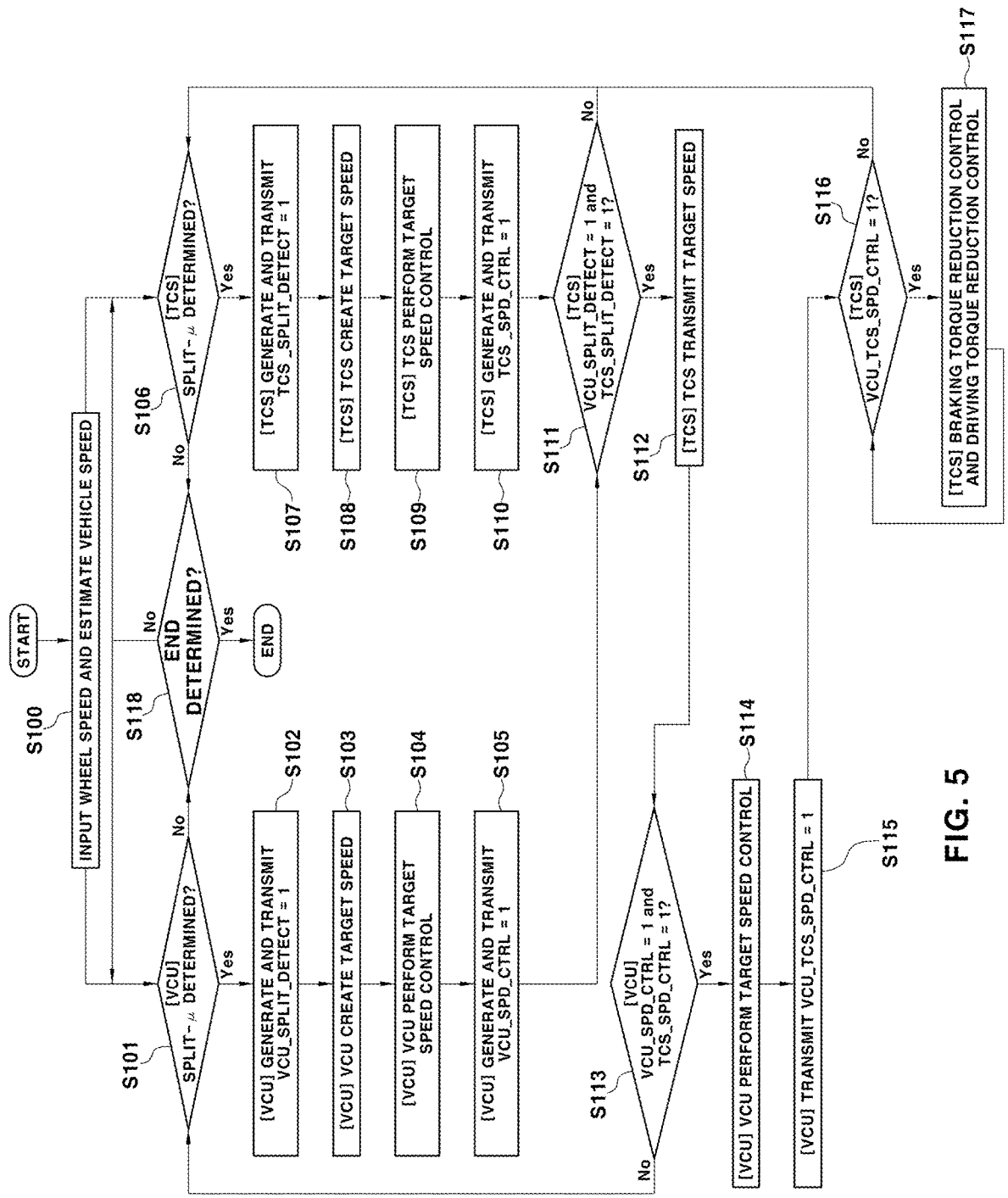
FIG. 5 is a flowchart showing a control procedure according to various exemplary embodiments of the present disclosure.
Figure 6:
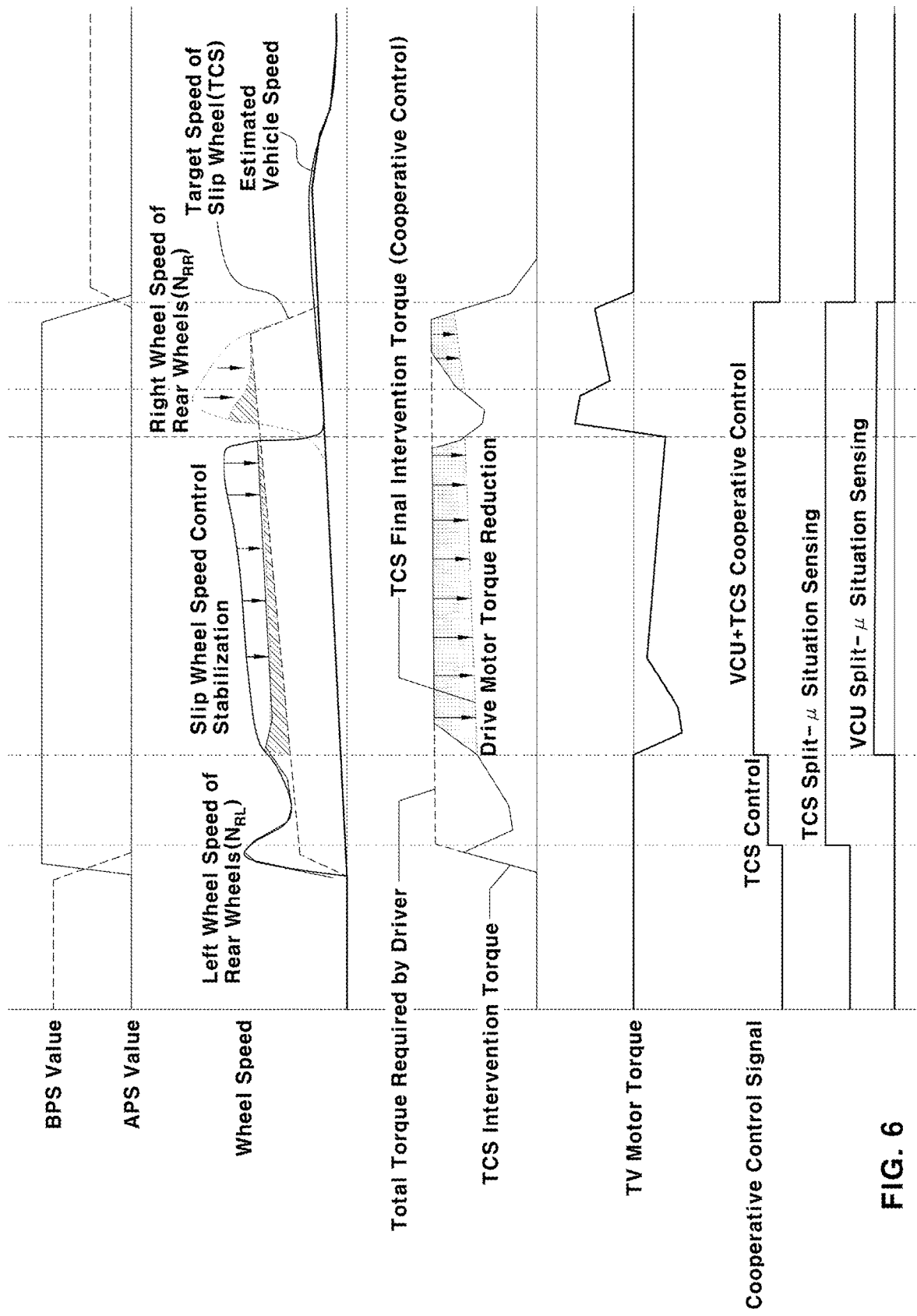
FIG. 6 is a view showing results and states of the control procedure according to the exemplary embodiment of the present disclosure.

FIG. 5 is a flowchart showing a control procedure according to various exemplary embodiments of the present disclosure. FIG. 6 is a view showing results and states of the control procedure according to the exemplary embodiment of the present disclosure. FIG. 6 shows that cooperative control is performed between the VCU 20 and the TCS controller 30 after launching of the vehicle. In the flowchart of FIG. 5, "[VCU]" indicated in a part of steps represents that the VCU 20 is a subject performing the part of steps, and "[TCS]" indicated in the remaining part of steps represents that the TCS controller 30 is a subject performing the remaining part of steps.

The two controllers, that is, the VCU 20 and the TCS controller 30, individually determine whether or not a state of a road surface on which the vehicle is currently disposed is a situation that the vehicle is driven on a split road surface including different coefficients of friction at a left road surface thereof contacting with a left wheel of the vehicle and at a right road surface thereof contacting with a right wheel of the vehicle, that is, a split-μ situation.

In the instant case, when only one of the two controllers determines that a split-μ situation has occurred (that is, detecting of a split road surface and a split-μ situation), the controller, which determines that a split-μ situation has occurred, may determine and generate a target speed of the slipping wheel, and may then perform speed control for the TV motor 4 to control a speed of the slipping wheel, at which slip has occurred, to be the determined and generated target speed.

In the following description, detecting of a split road surface and detecting of a split-μ situation mean determination of a split road surface and determination of a split-μ situation, respectively.

Referring to FIG. 6, an example in which a time when a decrease in BPS value and an increase in APS value occur is a time when the vehicle launches, and the TCS controller 30 first detects a split-μ situation through determination of the current road surface state upon launching of the vehicle ("TCS split-μ situation detecting"). When the TCS controller 30 alone detects a split-μ situation, as described above, a target speed is determined and generated in the TCS controller 30 in accordance with an internal logic of the TCS controller 30.

On the other hand, when both the TCS controller 30 and the VCU 20 detect a split-μ situation, that is, when a split-μ situation is detected by the TCS controller 30 ("TCS split-μ situation detecting"), and at the same time, a split-μ situation is detected by the VCU 20 ("VCU split-μ situation detecting"), cooperative control of the VCU 20 and the TCS controller 30 is performed.

In the instant case, in accordance with the cooperative control of the VCU 20 and the TCS controller 30, speed control for the TV motor 4 ("VCU+TCS cooperative control") may be preferentially performed to enable a speed of the slip wheel to follow the target speed.

Referring to the example of FIG. 6, it may be seen that the VCU 20 also detects a split-μ situation after detecting of a split-μ situation by the TCS controller 30. When both the TCS controller 30 and the VCU 20 detect the split-μ situation, slip wheel speed control using the TV motor 4 is performed by the VCU 20 so that the speed of the slip wheel follows the target speed determined and generated by the TCS controller 30 ("VCU+TCS cooperative control").

This procedure will now be described stepwise with reference to FIG. 5. Steps S101 to S105 and steps S106 to S110 in FIG. 5 represent that the VCU 20 and the TCS controller 30 individually determine whether or not a split-μ situation has occurred, and when only one of the VCU 20 and the TCS controller 30 determines that a split-μ situation has occurred, the controller detecting the split-μ situation among the two controllers generates a target speed in accordance with an internal logic thereof, and then performs speed control for the TV motor 4 facilitating a slip wheel speed to follow the target speed.

That is, steps S101 to S105 in FIG. 5 represent a procedure in which the VCU 20 generates a target speed in accordance with detecting of a split-μ situation, and then performs slip wheel speed control using the TV motor 4, and steps S106 to S1110 in FIG. 5 represent a procedure in which the TCS controller 30 generates a target speed in accordance with detecting of a split-μ situation, and then performs slip wheel speed control using the TV motor 4.

As shown in FIG. 5, the VCU 20 and the TCS controller 30 obtain real-time wheel speed (rotation speed) information $N_{FL}$, $N_{FR}$, $N_{RL}$, and $N_{RR}$ detected by wheel speed sensors provided at respective wheels and included in the driving information detection unit (step S100). That is, the VCU 20 obtains a left wheel speed and a right wheel speed of the front wheels and a left wheel speed and a right wheel speed of the rear wheels from signals of the wheel speed sensors. Furthermore, the VCU 20 and the TCS controller 30 estimate a current vehicle speed (step S100).

In the instant case, the VCU 20 estimates a vehicle speed based on the wheel speeds detected by respective wheel speed sensors of the driving information detection unit, that is, the left wheel speed and the right wheel speed of the front wheels and the left wheel speed and the right wheel speed of the rear wheels, as expressed by the following Equation 4:

$$V_{veh} = \min(V_{FL}, V_{FR}, V_{RL}, V_{RR}) \quad \text{[Equation 4]}$$

where, $V_{veh}$ represents an estimated vehicle speed (km/hr), and $V_{FL}$, $V_{FR}$, $V_{RL}$, and $V_{RR}$ are vehicle body speeds (km/hr) converted from wheel speeds detected by respective wheel speed sensors of the wheels, that is, rotation speeds $N_{FL}$, $N_{FR}$, $N_{RL}$, and $N_{RR}$ (RPM) of respective wheels.

The vehicle speed estimated as described above is also a vehicle body speed, and is a reference vehicle speed for determining generation of slip at each wheel, and determining a slip rate. The reference vehicle speed means a vehicle speed in a state in which there is no slip, and is information required for TCS operation.

Furthermore, wheel speeds $N_{FL}$, $N_{FR}$, $N_{RL}$, and $N_{RR}$ detected by respective wheel speed sensors are converted into vehicle body speeds $V_{FL}$, $V_{FR}$, $V_{RL}$, $V_{RR}$, and a minimum one of the vehicle body speeds $V_{FL}$, $V_{FR}$, $V_{RL}$, $V_{RR}$ converted from respective wheel speeds is determined as the estimated vehicle speed, that is, the reference vehicle speed.

When wheel speed sensor failure has occurred, an estimated wheel speed $N_{wheel}$ may be determined from a rotation speed of the drive motor 3, that is, a real-time drive motor speed $N_{main}$ obtained from a resolver signal, as expressed by the following Equation 5, and the estimated vehicle speed $V_{veh}$, which is the reference vehicle speed, may be determined from the estimated wheel speed $N_{wheel}$:

$$N_{wheel} = N_{main} \times FGR_{main} \quad \text{[Equation 5]}$$

where, $N_{wheel}$ represents a drive motor speed, and $FGR_{main}$ represents a speed reduction ratio between the drive motor 3 and a wheel (that is, a drive motor speed reduction ratio).

Furthermore, a vehicle acceleration ax detected by an acceleration sensor may be integrated, and a vehicle speed, which is a result of the integration, may then be determined as the estimated vehicle speed $V_{veh}$.

After an estimated vehicle speed, which is a reference vehicle speed, is determined from a wheel speed of each wheel, as described above, whether or not slip has occurred at the wheel may be determined. When a difference between each of vehicle body speeds $V_{FL}$, $V_{FR}$, $V_{RL}$, $V_{RR}$ converted from wheel speeds of respective wheels and the reference vehicle speed, that is, the estimated vehicle speed $V_{veh}$ is greater than a predetermined critical speed, as expressed in the following Equation 6, it is determined that slip has occurred at the corresponding wheel.

when $|V_{veh}-V_{FL}|$>Critical Speed,$Slip_{FL}$=1 when $|V_{veh}-V_{FR}|$>Critical Speed,$Slip_{FR}$=1 when $|V_{veh}-V_{RL}|$>Critical Speed,$Slip_{RL}$=1 when $|V_{veh}-V_{RR}|$>Critical Speed,$Slip_{RR}$=1 [Equation 6]

In Equation 6, "$Slip_{FL}$=1", "$Slip_{FR}$=1", "$Slip_{RL}$=1", and "$Slip_{RR}$=1" represent that slip has occurred at the corresponding wheels. Furthermore, when slip has occurred at only one of the left and right wheels, it may be determined that the current situation is a split-μ situation (step S101).

That is, when "(((Slip$_{FL}$ XOR Slip$_{FR}$)==1)) OR ((Slip$_{RL}$ XOR Slip$_{RR}$)==1))==1", it is determined that a split road surface state and a split-μ situation have occurred, and an internal intervention request is made in the VCU 20 in such a split-μ situation.

Furthermore, upon determining that a split-μ situation has occurred, the VCU 20 transmits, to the TCS controller 30, a signal indicating detecting of the split-μ situation (VCU_SPLIT_DETECT=1, hereinafter referred to as a "split-μ situation detection signal of the VCU") (step S102).

Furthermore, the VCU 20 determines and generates a target speed of a wheel at which slip has occurred, that is, a slip wheel (step S103). In the instant case, the target speed of the slip wheel may be determined to be a value obtained by adding a slip allowance speed to an estimated wheel speed, as expressed by the following Equation 7.

Target Speed=Estimated Wheel Speed+Slip Allowance Speed [Equation 7]

When the target speed is determined, as described above, the VCU 20 performs speed control so that the slip wheel speed follows the target speed internally determined as described above (step S104). In the instant case, the VCU 20 may perform speed control using the TV motor 4 to control the slip wheel speed to correspond to the target speed. In detail, the VCU 20 may perform PID control so that the speed of the TV motor 4 follows the target sped, to control the slip wheel speed to correspond to the target speed.

Subsequently, the VCU 20 transmits, to the TCS controller 30, a signal requesting cooperative control for control of the slip wheel speed (VCU_SPD_CTRL=1, hereinafter referred to as a "cooperative control request signal of the VCU") (step S105).

Furthermore, the VCU 20 determines an internal intervention torque through PID control, etc., and reflects the determined internal intervention torque in a motor torque command, determining a final motor torque command.

Meanwhile, separately from a determination as to whether or not a split-μ situation has occurred by the VCU 20, the TCS controller 30 also determines a road surface state of a road on which the vehicle is currently driven, based on real-time information collected through sensors, etc., in accordance with an internal logic thereof.

Furthermore, similarly to the VCU 20, the TCS controller 30 determines whether or not the current driving road is a split road surface, based on the determined road surface state, and determines whether or not the current vehicle driving situation is a split-μ situation (step S106).

As described above, the VCU 20 and the TCS controller 30 separately check whether or not the current driving situation is a split-μ situation, based on real-time information collected from the vehicle, and when both the VCU 20 and the TCS controller 30 determined in step S118 that the current driving situation is not a split-μ situation, control is ended.

On the other hand, when a split road surface and a split-μ situation were detected only by the TCS controller 30 without being detected by the VCU 20 in step S106, that is, when the VCU 20 determined that the current situation is not a split-μ situation, but the TCS controller 30 determined that the current situation is a split-μ situation, steps S107 to S110 are performed.

First, when the TCS controller 30 also determined that the current situation is a split-μ situation, the TCS controller 30 transmits, to the VCU 20, a signal indicating detecting of a split-μ situation (TCS_SPLIT_DETECT=1, hereinafter referred to as a split-μ situation detection signal of the TCS controller) (step S107).

Furthermore, similarly to determination and creation of a target speed of a wheel, at which slip has occurred, that is, a slip wheel, by the VCU 20, the TCS controller 30 also separately determines and generates a target speed of the slip wheel in accordance with an internal logic thereof (step S108).

Determination of a split-μ situation performed by the TCS controller 30, the method for determining and generating a target speed of the slip wheel, and a procedure of the method are technologies well known to those skilled in the art in association with TCS control, and accordingly, no detailed description thereof will be given.

The TCS controller 30 performs slip wheel speed control for control of a slip wheel speed to correspond to the target speed in accordance with an internal logic thereof, using the frictional braking device and the drive motor 3 (step S109). The TCS controller 30 has a right to control a torque of the drive motor 3 (a driving torque) and a torque of the frictional braking device (a braking torque).

Furthermore, the TCS controller 30 may transmit, to the VCU 20, a signal requesting cooperative control for control of the slip wheel speed (TCS_SPD_CTRL=1, hereinafter referred to as a "cooperative control request signal of the TCS") (step S110).

Meanwhile, both the VCU 20 and the TCS controller 30 may detect a split road surface and a split-μ situation. That is, both controllers 20 and 30 may determine that the current situation is a split-μ situation. In the instant case, both controllers 20 and 30 may share the determination that both controllers 20 and 30 detected the split-μ situation.

That is, the TCS controller 30 transmits the split-μ situation detection signal (TCS_SPLIT_DETECT=1) to the VCU 20 simultaneously with detecting of a split-μ situation according to an internal logic thereof, and the VCU 20 transmits the split-μ situation detection signal (VCU_SPLIT_DETECT=1) to the TCS controller 30 simultaneously with detecting of a split-μ situation according to an internal logic thereof.

In the instant case, when, among the two controllers, the TCS controller 30 receives a split-μ situation detection signal (VCU_SPLIT_DETECT=1) of the VCU 20 in a state in which the TCS controller 30 has generated a split-μ situation detection signal (TCS_SPLIT_DETECT=1) in accordance with detecting of a split-μ situation through the internal logic thereof (step S111), the TCS controller 30 determines that both controllers have detected the split-μ situation, determining that cooperative control between both controllers is required. For cooperative control, the TCS controller 30 then transmits, to the VCU 20, a target speed determined and generated in accordance with an internal logic thereof (step S112).

Furthermore, when the VCU 20 confirms reception of a cooperative control request signal (TCS_SPD_CTRL=1) of the TCS controller 30 in step S113 after receiving a slip wheel target speed from the TCS controller 30 in a state in which the VCU 20 has generated a cooperative control request signal (VCU_SPD_CTRL=1) for slip wheel speed control in accordance with detecting of a split-μ situation, the VCU 20 performs slip wheel speed control using the TV motor 4 in accordance with the slip wheel target speed received from the TCS controller 30 (step S114).

That is, when the VCU 20 receives a cooperative control request signal of the TCS controller 30 after detecting a split-μ situation, the VCU 20 also determines that cooperative control of both controllers is required because both controllers have detected the split-μ situation. Accordingly, the VCU 20 performs slip wheel speed control in accordance with the slip wheel target speed of the TCS controller 30 received from the TCS controller 30, and performs speed control for the TV motor 4 to enable the slip wheel speed to correspond to the target speed.

In the instant case, the VCU 20 has a right to control the TV motor 4. Accordingly, when the VCU 20 performs speed control for the TV motor 4 to control the slip wheel speed to correspond to the target speed, the VCU 20 generates and outputs a motor torque command for the TV motor 4 for the above-described speed control. Accordingly, the MCU 40 is configured to control operation of the TV motor 4 in accordance with the motor torque command output from the VCU 20.

Step S113 is a step of determining whether or not the VCU 20 satisfies conditions requiring cooperative control for control of a slip wheel speed. The conditions requiring cooperative control include a condition that the VCU 20 has generated a cooperative control request signal (VCU_SPD_CTRL=1) by itself in a state in which the VCU 20 has detected a split-μ situation by itself and a condition that the VCU 20 has received a cooperative control request signal (TCS_SPD_CTRL=1) of the TCS controller 30. When the two conditions are satisfied, the VCU 20 determines that conditions requiring cooperative control for control of the slip wheel speed are satisfied.

When the conditions requiring cooperative control are satisfied as the VCU 20 receives a cooperative control request signal of the TCS controller 30 after detecting a split-μ situation and generating a cooperative control request signal by itself in step S113, as described above, the VCU 20 performs slip wheel speed control using the TV motor 4 in accordance with the slip wheel target speed of the TCS controller 30 (step S114). However, when the conditions requiring cooperative control are not satisfied, control proceeds to step S101, and determination of a split-μ situation is again performed.

Furthermore, the VCU 20, which performs speed control for the TV motor 4 in accordance with the target speed of the TCS controller 30 as the conditions requiring cooperative control are satisfied, in step S113, also transmits, to the TCS controller 30, another cooperative control request signal (VCU_TCS_SPD_CTRL=1) requesting cooperative control for control of the frictional braking device and control of the drive motor 3 in step S115.

When the TCS controller 30 receives the cooperative control request signal (VCU_TCS_SPD_CTRL=1) from the VCU 20, the TCS controller 30 determines whether conditions requiring cooperative control for control of the frictional braking device and control of the drive motor 3 are satisfied (step S116), and then performs control of the frictional braking device and control of the drive motor 3 (step S117).

When the TCS controller 30 receives, from the VCU 20, the cooperative control request signal (VCU_TCS_SPD_CTRL=1) requesting cooperative control for control of the frictional braking device and control of the drive motor 3, the TCS controller 30 has a right to control the frictional braking device and the drive motor 3.

Furthermore, the torque vectoring apparatus is configured to transmit a torque of the TV motor 4 so that the torque output from the TV motor 4 acts on a slip wheel among the drive wheels as a torque reverse to a driving torque of the drive motor 3, that is, a braking torque while acting on a non-slip wheel, which is a wheel opposite to the slip wheel, as a driving torque in a direction identical to the direction of the driving torque of the drive motor 3.

Taking into consideration the above-described conditions, the TCS controller 30 receives a motor torque command for the TV motor 4 (a torque command for the torque vectoring motor) from the VCU 20, and determines an intervention torque for control of the frictional braking device and the drive motor 3 based on the received motor torque command. In the instant case, the TCS controller 30 determines a braking torque reduction amount for reducing a frictional braking torque of the frictional braking device provided at the slip wheel by a braking torque transmitted from the TV motor 4 to the slip wheel, and determines a driving torque reduction amount for reducing an actual driving torque of the drive motor 3 by a driving torque transmitted from the TV motor 4 to the non-slip wheel.

The braking torque reduction amount becomes an intervention torque for the frictional braking device, and the driving torque reduction amount becomes an intervention torque for the drive motor 3. The non-slip wheel is a wheel opposite to the slip wheel. When the right wheel of the rear wheels is a slip wheel, the left wheel of the rear wheels is a non-slip wheel.

The braking torque reduction amount and the driving torque reduction amount determined by the TCS controller 30 are transmitted to the VCU 20 and the brake controller 50. At the same time, the TCS controller 30 requests the VCU 20 for torque intervention for the drive motor 3 in accordance with an internal logic thereof. Furthermore, the TCS controller 30 requests the brake controller 50 for torque intervention for the frictional braking device in accordance with an internal logic thereof.

As a result, the VCU 20 determines and generates a final motor torque command by reflecting the driving torque reduction amount corresponding to the intervention torque in a motor torque command for a required total torque determined based on real-time vehicle driving information, and outputs the final motor torque command. Accordingly, the MCU 40 is configured to control operation of the drive motor 3 in accordance with the motor torque command output from the VCU 20, and accordingly, a driving torque reduced by the driving torque reduction amount may be output from the drive motor 3.

That is, correction for reducing the torque command for the drive motor 3 determined based on the required total torque command by the driving torque reduction amount is performed, and operation of the drive motor 3 is then controlled in accordance with the corrected torque command.

Furthermore, the brake controller 50 determines and generates a final frictional braking torque by reflecting a braking torque reduction amount corresponding to the intervention torque in the frictional braking torque, and then is configured to control operation of the frictional braking device to apply the final frictional braking torque to the wheel, and accordingly, a frictional braking torque reduced by the braking torque reduction amount in the frictional braking device is applied to the wheel.

That is, correction for reducing the frictional braking torque by the braking torque reduction amount is performed, and operation of the frictional braking device is controlled so that the corrected frictional braking torque (the final frictional braking torque) is applied to the wheel.

Heretofore, an example in which the VCU 20 transmits, to the TCS controller 30, a motor torque command for the TV motor 4 (a toque command for the torque vectoring motor), the TCS controller 30 determines a driving torque reduction amount based on the motor torque command for the TV motor 4 received from the VCU 20, and transmits the determined driving torque reduction amount to the VCU 20, and the VCU 20 then performs correction for reducing the motor torque command for the drive motor 3 by the driving torque reduction amount received from the TCS controller 30 has been described.

Although the motor torque command may be corrected by the VCU 20 to be reduced by the driving torque reduction amount determined by the TCS controller 30, as described above, the TCS controller 30 may receive a motor torque command for the drive motor 3 from the VCU 20, and may then perform correction for reducing the received torque command by the driving torque reduction amount.

In the instant case, the TCS controller 30 may transmit the corrected motor torque command to the VCU 20, and the VCU 20 may receive the corrected motor torque command from the TCS controller 30, and may then control operation of the drive motor 3 in accordance with the corrected motor torque command (a final motor torque command) through cooperative control with the MCU 40.

Referring to the example of FIG. 6, it may be seen that, when the TCS controller 30 determines that the current situation is a split-μ situation, determination of an external intervention torque and an external intervention request are made by the TCS controller 30. It may also be seen that, when the VCU 20 also subsequently determines that the current situation is a split-μ situation, determination of an internal intervention torque and an internal intervention request are made by the VCU 20.

Thus, when both the VCU 20 and the TCS controller 30 determine that the current situation is a split-μ situation, cooperative control between the VCU 20 and the TCS controller 30 is performed. In the cooperative control, the VCU 20 performs speed control for the TV motor 4 to follow a target speed, and the TCS controller 30 performs torque control for the drive motor 3 in accordance with a final motor torque command.

Furthermore, when both the VCU 20 and the TCS controller 30 determine that the current situation is not a split-μ situation, in a final determination step S118, during execution of the control procedure of FIG. 5, all control procedures are ended.

Furthermore, when the VCU 20 is in a state in which the VCU 20 could not detect a split road surface and a split-μ situation or in a state in which the VCU 20 releases determination as to a split-μ situation after detecting a split-μ situation, but the TCS controller 30 is in a state in which the TCS controller 30 determines that the current situation is a split-μ situation (in a state in which the TCS controller 30 has detected a split-μ situation), TCS control in steps S107 to S110 is maintained.

Furthermore, when the TCS controller 30 is in a state in which the TCS controller 30 could not detect a split road surface and a split-μ situation or in a state in which the TCS controller 30 releases determination as to a split-μ situation after detecting a split-μ situation, but the VCU 20 is in a state in which the VCU 20 determines that the current situation is a split-μ situation (in a state in which the VCU 20 has detected a split-μ situation), VCU control in steps S102 to S105 is maintained.

Furthermore, the state in which both the VCU 20 and the TCS controller 30 have detected a split road surface and a split-μ situation is continuously maintained, cooperative control states of the VCU 20 and the TCS controller 30 are also continuously maintained.

Briefly, the VCU 20 and the TCS controller 30 individually determine whether or not a road surface state of a road on which the vehicle is currently driven is a split-μ situation. When one of the two controllers detects a split-μ situation, traction control of the vehicle including torque vectoring is performed by the controller detecting the split-μ situation. However, when both the controllers sense a split-μ situation, traction control of the vehicle is performed through cooperative control of the two controllers.

Furthermore, it has been described that, when both the VCU 20 and the TCS controller 30 detect a split-μ situation, traction control of the vehicle is performed through cooperative control of the two controllers 20 and 30. However, when only one of the two controllers 20 and 30 detects a split-μ situation, the controller detecting the split-μ situation may determine a target speed for control of slip wheel speed, may generate a motor torque command for the TV motor 4 for control of slip wheel speed to follow the determined target speed, and may then control operation of the TV motor 4 in accordance with the generated motor torque command for the TV motor 4.

Thus, in accordance with the exemplary embodiment of the present disclosure, in the vehicle provided with the motor-driven torque vectoring apparatus, the VCU 20 and the TCS controller 30 (or the ESC controller) perform cooperative control for distribution of left and right driving forces only in left and right split-μ situations.

In accordance with the exemplary embodiment of the present disclosure, it may be possible to enhance launching response of the vehicle by applying a braking torque to a slip wheel while applying a driving torque to a non-slip wheel through the TV motor 4 when it is determined that a split-μ situation has occurred.

Furthermore, in accordance with the exemplary embodiment of the present disclosure, a reduced braking torque is used during cooperative control, as compared to control by the TCS controller 30 alone, and accordingly, it may be possible to enhance durability of the frictional braking device and to reduce a driving torque of the vehicle by a torque of the TV motor 4 applied to a non-slip wheel. Accordingly, energy consumption may be reduced.

Furthermore, in accordance with the exemplary embodiment of the present disclosure, the VCU 20 and the TCS controller 30 do not use target speeds separately determined thereby, and the VCU 20 receives the target speed determined by the TCS controller 30, and accordingly, both the VCU 20 and the TCS controller 30 perform speed control for a slip wheel at the same target speed. Accordingly, speed control stability may be enhanced.

Under the condition that the VCU 20 alone performs control, a braking torque required in a split-μ situation may be insufficient when the capacity of the TV motor 4 is small. In accordance with the exemplary embodiment of the present disclosure, however, the problem associated with the capacity of the TV motor 4 may be eliminated through cooperative control between the VCU 20 and the TCS controller 30. Through cooperative control between the VCU 20 and the TCS controller 30, speed control may be enhanced corresponding to the torque capacity of the TV motor 4. Furthermore, initial launching response, durability of the frictional braking device, and electricity consumption efficiency may be enhanced.

As apparent from the above description, in the traction control method for a vehicle according to the exemplary embodiment of the present disclosure, speed control for a torque vectoring motor is performed, and accordingly, there are advantages in that launching response and launching linearity are enhanced, as compared to traction control in a split-μ situation using a conventional hydraulic braking device (frictional braking device).

Furthermore, a braking torque, which is a torque reverse to a driving torque of the drive motor, is applied to a slip wheel by the torque vectoring motor, and, accordingly, the torque of the hydraulic braking device is reduced, as compared to that of the conventional hydraulic braking device. Accordingly, durability of the hydraulic braking device may be enhanced. Furthermore, a driving torque, which is a torque of the same direction as the driving torque of the drive motor, is applied to a non-slip wheel by the torque vectoring motor, and accordingly, a reduction in torque may be achieved, as compared to a conventional drive motor. Accordingly, electricity consumption efficiency may be enhanced. The torque vectoring motor operates in a regenerative braking range in traction control in a split-μ situation, and accordingly, an enhancement in electricity consumption efficiency may be achieved.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A traction control method for a vehicle provided with a torque vectoring apparatus including a torque vectoring motor, the traction control method comprising:
   determining, by a first controller and a second controller, whether a current situation of the vehicle is a split-µ situation occurring when the vehicle is driven on a split road surface, based on vehicle driving information collected in the vehicle;
   determining and generating, by the second controller, a target speed for control of a slip wheel speed when the first controller and the second controller determine that the current situation is the split-µ situation, and transmitting the target speed from the second controller to the first controller;
   generating, by the first controller, a torque command for the torque vectoring motor for control of the slip wheel speed to follow the target speed received from the second controller; and
   controlling, by the first controller, operation of the torque vectoring motor in accordance with the generated torque command.

2. The traction control method of claim 1, further including:
   transmitting, by the first controller, the generated torque command for the torque vectoring motor to the second controller;
   determining, by the second controller, a driving torque reduction amount of a drive motor, according to the torque command for the torque vectoring motor received from the first controller; and
   transmitting, by the second controller, the determined driving torque reduction amount of the drive motor to the first controller.

3. The traction control method of claim 2, wherein the first controller is configured to correct a torque command for the drive motor to drive the vehicle, according to the driving torque reduction amount of the drive motor received from the second controller.

4. The traction control method of claim 3,
   wherein the first controller is configured to control operation of the drive motor in accordance with the corrected torque command, and
   wherein the first controller is a vehicle control unit (VCU) configured to determine a required total torque command according to a driving intention of a driver, according to the vehicle driving information detected by a driving information detection unit, and to determine the torque command for the drive motor based on the determined required total torque command.

5. The traction control method of claim 4, wherein the corrected torque command is a torque command obtained by reducing the torque command for the drive motor determined based on the required total torque command by the drive torque reduction amount.

6. The traction control method of claim 2, wherein further including:
   determining, by the second controller, a braking torque reduction amount of a frictional braking device, according to the torque command for the torque vectoring motor received from the first controller; and
   transmitting, by the second controller, the determined braking torque reduction amount of the frictional braking device to the first controller.

7. The traction control method of claim 6,
   wherein the first controller is configured to transmit the received braking torque reduction amount of the frictional braking deice to a brake controller, and
   wherein the brake controller is configured to correct a frictional braking torque of the frictional braking device, according to the braking torque reduction amount of the frictional braking device received from the first controller.

8. The traction control method of claim 7,
   wherein the frictional braking torque after the correction is a frictional braking torque obtained by reducing the frictional braking torque before the correction by the braking torque reduction amount, and
   wherein the brake controller is configured to control operation of the frictional braking device, to generate the frictional braking torque reduced by the braking torque reduction amount.

9. The traction control method of claim 1, further including:
   transmitting, by the first controller, the generated torque command for the torque vectoring motor to the second controller;
   determining, by the second controller, a driving torque reduction amount of a drive motor according to the torque command for the torque vectoring motor received from the first controller;
   receiving, by the second controller, a torque command for the drive motor to drive the vehicle from the first controller;
   correcting, by the second controller, the received torque command for the drive motor based on the determined driving torque reduction amount of the drive motor; and
   controlling, by the second controller, operation of the drive motor in accordance with the corrected torque command.

10. The traction control method of claim 1, wherein, in the controlling operation of the torque vectoring motor:
    the torque vectoring apparatus is controlled to transmit a torque output from the torque vectoring motor to a slip one of left and right drive wheels of the vehicle, at which slip has occurred, as a braking torque which is a torque reverse to a driving torque of a drive motor; and
    the torque vectoring apparatus is controlled to transmit the torque output from the torque vectoring motor to a non-slip one of the left and right drive wheels opposite to the slip wheel as a driving torque which is a torque in a direction identical in a direction of the driving torque of the drive motor.

11. The traction control method of claim 1, further including:
    determining and generating the target speed for control of the slip wheel speed when only one of the first controller and the second controller determines that the current situation is the split-µ situation, by the controller determining that the current situation is the split-µ situation;
    generating the torque command for the torque vectoring motor for control of the slip wheel speed to follow the target speed by the controller determining that the current situation is the split-µ situation; and
    controlling operation of the torque vectoring motor in accordance with the generated torque command for the torque vectoring motor by the controller determining that the current situation is the split-µ situation.

12. The traction control method of claim 1, wherein the first controller and the second controller are set so that, when each of the first controller and the second controller detects a split-µ situation through determination thereof as to the split-µ situation, the controller is configured to transmit a split-µ situation detection signal to a counterpart of the first controller and the second controller, to share a split-µ situation detecting state.

13. The traction control method of claim 12, wherein, in the transmitting the generated target speed to the first controller,
the second controller is configured to determine that the first controller and the second controller have detected the split-µ situation, when the second controller receives the split-µ situation detection signal from the first controller in a split-µ situation detected state thereof; and
the second controller is then configured to transmit the generated target speed to the first controller.

14. The traction control method of claim 13,
wherein the second controller is configured to transmit a cooperative control request signal for control of the slip wheel speed to the first controller, simultaneously with transmission of the generated target speed to the first controller, and
wherein when the first controller receives the cooperative control request signal for control of the slip wheel speed from the second controller in a split-µ situation detected state thereof, the first controller is configured to perform:
generating the torque command for the torque vectoring motor; and
controlling operating of the torque vectoring motor in accordance with the generated torque command.

15. The traction control method of claim 14, wherein the first controller is configured to perform control of the slip wheel speed by controlling operation of the torque vectoring motor, and to transmit, to the second controller, a cooperative control request signal for control of a frictional braking device and control of a drive motor.

16. The traction control method of claim 15,
wherein the second controller is configured to receive, from the first controller, the cooperative control request signal for control of the frictional braking device and control of the drive motor and the torque command for the torque vectoring motor,
wherein the second controller is configured to determine a driving torque reduction amount of the drive motor and a braking torque reduction amount of the frictional braking device, according to the received torque command for the torque vectoring motor, and
wherein the second controller is configured to transmit, to the first controller, the driving torque reduction amount of the drive motor and the braking torque reduction amount of the frictional braking device.

17. The traction control method of claim 16,
wherein the first controller is configured to correct the torque command for the drive motor to drive the vehicle, according to the driving torque reduction amount of the drive motor received from the second controller, and
wherein the first controller is configured to control operation of the drive motor in accordance with the torque command after the correction.

18. The traction control method of claim 16,
wherein the first controller is configured to transmit, to a brake controller, the braking torque reduction amount received from the second controller, and
wherein the brake controller is configured to correct the frictional braking torque of the frictional braking device according to the received braking torque reduction amount of the frictional braking device, and then, is configured to control operation of the frictional braking device to generate the frictional braking torque after the correction.

19. The traction control method of claim 1,
wherein the first controller is a vehicle control unit (VCU) configured to determine a motor torque command according to a driving intention of a driver, based on real-time vehicle driving information detected by a driving information detection unit, and
wherein the second controller is a controller of a traction control system (TCS).

* * * * *